United States Patent [19]

Tanaka et al.

[11] Patent Number: 4,968,356

[45] Date of Patent: Nov. 6, 1990

[54] METHOD OF PRODUCING HARDENED ALUMINUM ALLOY FORMING SHEET HAVING HIGH STRENGTH AND SUPERIOR CORROSION RESISTANCE

[75] Inventors: Hiroki Tanaka; Shin Tsuchida; Yuji Suzuki, all of Nagoya, Japan

[73] Assignee: Sumitomo Light Metal Industries, Ltd., Tokyo, Japan

[21] Appl. No.: 482,306

[22] Filed: Feb. 20, 1990

[30] Foreign Application Priority Data

Feb. 23, 1989 [JP] Japan .................................... 1-41877

[51] Int. Cl.$^5$ ............................................. C22C 21/00
[52] U.S. Cl. .......................... 148/11.5 A; 148/12.7 A; 420/533; 420/535
[58] Field of Search ..................... 148/12.7 A, 11.5 A; 420/533, 535

[56] References Cited

U.S. PATENT DOCUMENTS

| | | | |
|---|---|---|---|
| 4,066,476 | 1/1978 | Gullotti et al. | 148/12.7 A |
| 4,066,480 | 1/1978 | Gullotti et al. | 148/12.7 A |
| 4,284,437 | 8/1981 | Baba et al. | 148/11.5 A |
| 4,431,461 | 2/1984 | Hoshino et al. | 148/11.5 A |
| 4,469,537 | 9/1984 | Ashton et al. | 148/11.5 A |
| 4,582,541 | 4/1986 | Dean et al. | 148/11.5 A |
| 4,699,673 | 10/1987 | Kobayashi et al. | 148/11.5 A |
| 4,812,183 | 3/1989 | Sanders, Jr. et al. | 148/11.5 A |
| 4,838,958 | 6/1989 | Komatsubara et al. | 148/11.5 A |
| 4,874,578 | 10/1989 | Homberger et al. | 148/11.5 A |

Primary Examiner—Upendra Roy
Attorney, Agent, or Firm—Flynn, Thiel, Boutell & Tanis

[57] ABSTRACT

A method of producing a hardened aluminum alloy forming sheet having a high strength and a superior corrosion resistance, the method comprising the steps of (1) providing a melt having a composition consisting of, in weight percentage, 4.0 to 6.0% Mg, 0.05 to 0.50% Cu, 0.10 to 1.0% Mn, 0.01 to 0.05% Ti and the balance being aluminum and impurities; (2) cooling to solidify the melt; (3) hot rolling and cold rolling to form a rolled sheet; and (4) heat treating the rolled sheet by heating to a temperature of 150° to 300° C. at a heating rate of at least 5° C./second, holding within five minutes at the temperature of 150° to 300° C. and cooling to a temperature of 70° C. or less at a cooling rate of at least 30° C./second. The melt may further contain 0.05 to 0.20% by weight Cr and the heat treatment of the step (4) may be carried out under tension after flattening said cold-rolled sheet by leveling at ordinary temperatures. The aluminum alloy sheet is especially suitable for use in manufacturing easy open can ends.

4 Claims, 1 Drawing Sheet

METHOD OF PRODUCING HARDENED ALUMINUM ALLOY FORMING SHEET HAVING HIGH STRENGTH AND SUPERIOR CORROSION RESISTANCE

BACKGROUND OF THE INVENTION

1. Field of the Invention

The present invention relates to a method of producing hardened Al-Mg alloy forming sheets having a high strength and a superior corrosion resistance which are useful for easy open can ends or the like.

2. Description of the Prior Art

Conventionally, in making easy-open type can ends, there have been employed work hardened sheets fabricated from aluminum alloys including Mg as a primary alloying element, e.g., AA 5052, AA 5082, AA 5182 or the like in which cold rolling has been practiced to increase the strength of the resulting hardened sheets and further baking treatments of corrosion-resistant coatings applied to the sheets have been practiced. The hardened sheets in the as-cold-rolled state are susceptible to deterioration of the mechanical properties due to natural aging and are poor in formability. Therefore, stabilizing treatments at temperatures not exceeding 200° C for a period of several hours have been conducted in certain cases. Further, when the hardened sheets are subjected to leveling operations for improving the flatness, nonuniform residual strain will be introduced in the resulting sheets. Therefore, when the coatings are applied onto such sheets without any treatment and baked, the internal residual strain causes warpage or distortion in the sheets which will cause problems in subsequent operations. Therefore, in certain cases, flattened hardened sheets have been heat-treated in a horizontally fixed state in order to remove irregular stress. The heat treatments have been usually carried out over a period of at least several hours at 150° C. or less.

The stabilizing heat treatments as described above will precipitate compounds, such as $\beta$-phase ($Al_8Mg_5$), S-phase ($Al_2CuMg$), etc., which are electrochemically less noble relative to the matrix, along grain boundaries and working texture (disorder of crystal grains called "dislocation"), thereby resulting in a considerable reduction of the corrosion resistance of the alloys.

SUMMARY OF THE INVENTION

It is therefore an object of the present invention to provide a method of producing sheets which have a good formability and a good flatness (free of warpage or distortion due to residual stress), without lowering the corrosion resistance.

According to the present invention, there is provided a method of producing a hardened aluminum alloy forming sheet having a high strength and a superior corrosion resistance, the method comprising the steps of:

(1) providing a melt having a composition consisting of, in weight percentage,
 Mg: from 4.0 to 6.0%,
 Cu: from 0.05 to 0.50%,
 Mn: from 0.10 to 1.0%,
 Ti: from 0.01 to 0.05% and
the balance being aluminum and impurities;
(2) cooling to solidify the melt;
(3) hot rolling and cold rolling to form a rolled sheet; and
(4) heat treating the rolled sheet by heating to a temperature of 150 to 300 ° C at a heating rate of at least 5° C./ second, holding at the temperature of 150 to 300° C. within five minutes and cooling to a temperature of 70° C. or less at a cooling rate of at least 30° C./second.

The foregoing melt may further contain 0.05 to 0.20% Cr.

The present invention also provides a method of producing a hardened aluminum alloy forming sheet having a high strength and a superior corrosion resistance in which the heat treatment of the step (4) is carried out under tension after flattening the cold-rolled sheet by leveling at ordinary temperatures.

DETAILED DESCRIPTION OF THE PREFERRED EMBODIMENTS

Figure 1:
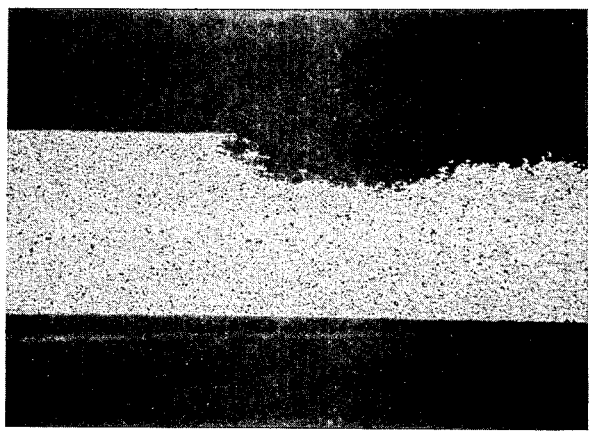
FIGS. 1 and 2 are microphotographs of the microstructures showing the corrosion states of the test specimens prepared in examples according to the present invention.

In the alloy composition of the present invention, Mg, Cu and Mn are added to adjust the strength of the resulting alloy materials. When the contents of these components are less than the respective lower limits, sufficient strength can not be obtained. On the other hand, when these components are present in amounts exceeding the upper limits, the hot-rolling formability 5 will be lowered. Ti and Cr are added to form a refined grain structure and thereby provide an improved formability. The amounts of the alloying elements are less than the lower limits, the refining effect will not be sufficiently achieved. Contents of these element exceeding the upper limits induce a course crystallization which affect unfavorably the formability.

The alloy composition of the present invention may include up to 0.40% Si, up to 0.50% Fe and up to 0.10% Zn as impurities.

In order to provide an ingot by solidifying the melt specified above, the melt is preferably cooled at a cooling rate in the range of 2 to 20° C./second.

In order to form the ingot into a rolled sheet, firstly, the ingot is heated to a temperature of 500 to 530° C., homogenized by holding at the temperature for a period of at least 0.5 hour and then hot-rolled. The starting temperature of the hot rolling is from 500 to 400° C. The hot-rolled sheet is subjected to an intermediate annealing after cold-rolling or without cold-rolling, and then cold-rolling to a final sheet thickness with a reduction in thickness of at least 50%. The intermediate annealing is preferably performed by rapid heating, brief heating at high temperatures and rapid cooling.

Subsequently, the cold-rolled sheet is subjected to the heat treatment including the rapid heating up and rapid cooling down under the conditions as specified above and there can be obtained satisfactory sheet products having a good formability and a good flatness (free of warpage due to the residual stress), without lowering the corrosion resistance. More specifically, firstly, the rolled sheet is heated to a temperature of 150 to 300° C. at a heating rate of at least 5° C./second. When the heating rate is less than 5° C./second, compounds which are base relative to the matrix are precipitated along grain boundaries, etc. Further, when the heating temperature is lower than 150° C., the residual stress is not effectively relieved. On the other hand, heating temperatures exceeding 300° C. cause recrystallization and results in a reduction of the strength. If the holding time exceeds five minutes, undesirable compounds which are base relative to the matrix are precipitated. Then, the alloy sheet is cooled to a temperature of 70° C or less, otherwise undesirable precipitation of a β-phase or S-phase will occur. In the thermal treatment procedure, when the rolled sheet is flattened by leveling at ordinary temperatures and then the heat treatment is conducted while applying tension to the sheet, the flatness and the mechanical properties will be further improved.

Now, examples of the present invention are described in comparison with comparative examples.

EXAMPLE 1

Ingots having the alloy compositions shown in Table 1 were prepared.

TABLE 1

| Alloy | Chemical Composition of Test Specimens (by weight percent) | | | | | | | | |
|---|---|---|---|---|---|---|---|---|---|
| | Si | Fe | Cu | Mn | Mg | Cr | Zn | Ti | Al |
| X | 0.12 | 0.30 | 0.05 | 0.65 | 5.50 | 0.02 | 0.04 | 0.02 | Bal |
| Y | 0.09 | 0.25 | 0.11 | 0.47 | 4.85 | 0.06 | 0.03 | 0.02 | Bal |
| Z | 0.10 | 0.23 | 0.03 | 0.36 | 4.27 | 0.12 | 0.04 | 0.03 | Bal |

The prepared ingots were heated at 500° C for 2 hours and hot-rolled. The starting temperature of the hot-rolling was 480° C. Then, cold-rolled sheets having a thickness of 0.30 mm were formed through the steps of cold-rolling, intermediate annealing (heating to 350° C. at a heating rate of 30° C/hour, holding at 350° C. for 2 hours and cooling to room temperature at a cooling rate of 30° C./hour) and cold-rolling (80% reduction).

These cold-rolled sheets were subjected to the following three different kinds of heat treatments.

A. heating to 200° C. at a heating rate 40° C./second, holding at 200° C. for 30 seconds and cooling to room temperature at a cooling rate of 40° C./second B. heating to 270° C. at a heating rate 10° C./second, holding at 270° C. for 20 seconds and cooling to room temperature at a cooling rate of 40° C./second C. heating to 170° C. at a heating rate 40° C./hour, holding at 170° C. for 2 hours and cooling to room temperature at a cooling rate of 40° C./hour Comparative tests with respect to corrosion resistance were conducted as follows. Each test specimen was immersed in a 0.1 M-NaCl aqueous solution and electrolyzing was carried out for a period of 48 hours at a current density of 0.5 mA/cm$^2$.

Figure 2:
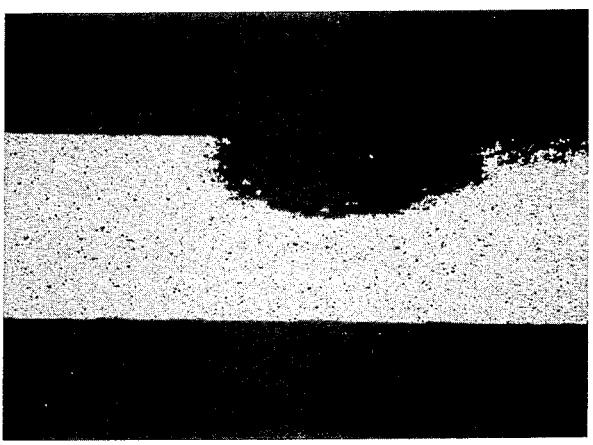
Figure 3:
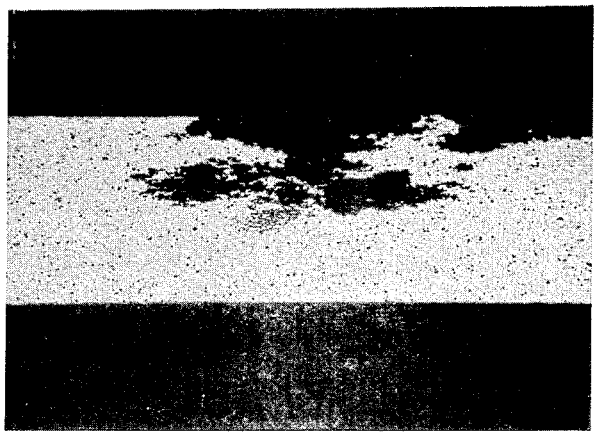
FIG. 3 is a microphotograph of the microstructure showing the corrosion state of the comparative test specimen.

The drawings are microphotographs showing the corrosion states examined for the cross sections of the test specimens of Alloy Y. FIG. 1 is for the test specimen heat treated by the treatment A, FIG. 2 is for the test specimen heat treated by the heat treatment B and FIG. 3 is for the test specimen heat treated by the heat treatment C. It can be seen from the microphotographs that corrosion in the test specimens receiving the heat treatments A and B in accordance with the present invention is very slight as compared with the specimen of the heat treatment C.

Such a difference in corrosion can be confirmed by measurements of pitting potentials as set forth below. For the measurements of pitting potentials, heat treated test specimens X, Y and Z were etched in a 10% NaOH aqueous solution at 60° C for 30 seconds, rinsed with water, neutralized with a 30% HNO$_3$ aqueous solution at room temperature for 60 seconds and rinsed with water. Degassing was carried out for a period of one hour by bubbling air at a rate of 200 ml/minute into a 0.1 M-NaCl aqueous solution (pH =3.0) and each test specimen was immersed in the NaCl solution. After the spontaneous potential of each test specimen was stabilized, polarization was measured at a scanning rate of 10 mV/minute. The results of the measurements are shown in Table 2.

TABLE 2

| Alloy | Pitting Potential (mV vs SCE) | | |
|---|---|---|---|
| | Treatment | | |
| | A | B | C |
| X | −675 | −695 | −740 |
| Y | −670 | −690 | −736 |
| Z | −657 | −683 | −720 |

It is clear from the above results that the test specimens of the treatments A and B possess more noble pitting potentials than the test specimen of the treatment C and the former two are insusceptible to corrosion as compared with the latter.

Table 3 shows the mechanical properties of the alloy sheets which were heat treated by the respective treatments A, B and C and then were subjected to an additional heat treatment consisting of rapid heating up, holding at 205° C for 10 minutes and rapid cooling down. The additional heat treatment is comparable to a baking treatment which is ordinarily practiced on a coating applied onto can end stock. All of the alloy sheets had a sufficient strength and formability as can end stock.

TABLE 3

| Alloy | Treatment | Mechanical Properties | | | | |
|---|---|---|---|---|---|---|
| | | Yield strength (kgf/mm$^2$) | Tensile strength (kgf/mm$^2$) | Elongation (%) | Erichsen value (mm) | Bend ductility* |
| X | A | 34.5 | 42.1 | 9 | 4.8 | 14.8 |
| | B | 33.4 | 40.5 | 10 | 5.0 | 15.6 |
| | C | 33.8 | 41.2 | 8 | 4.9 | 14.0 |
| Y | A | 32.8 | 39.8 | 10 | 5.0 | 15.4 |
| | B | 31.6 | 38.3 | 11 | 5.2 | 15.9 |
| | C | 32.0 | 39.1 | 11 | 5.0 | 14.7 |
| Z | A | 31.9 | 38.7 | 7 | 4.9 | 15.9 |
| | B | 30.9 | 37.0 | 9 | 5.0 | 16.2 |
| | C | 31.7 | 38.4 | 7 | 4.7 | 15.0 |

*Average number of bending cycles for ten test specimens until rupture occurred.

EXAMPLE 2

TABLE 4

| Alloy | Chemical Composition (wt. %) | | | | | | | | |
|---|---|---|---|---|---|---|---|---|---|
| | Si | Fe | Cu | Mn | Mg | Cr | Zn | Ti | Al |
| 1 | 0.09 | 0.26 | 0.13 | 0.46 | 4.80 | 0.07 | 0.07 | 0.02 | Bal |
| 2 | 0.11 | 0.32 | 0.07 | 0.42 | 4.75 | 0.06 | 0.05 | 0.03 | Bal |
| 3 | 0.10 | 0.27 | 0.05 | 0.35 | 4.40 | 0.04 | 0.03 | 0.02 | Bal |
| 4 | 0.11 | 0.29 | 0.14 | 0.12 | 4.50 | 0.09 | 0.06 | 0.02 | Bal |
| 5 | 0.12 | 0.30 | 0.30 | 0.35 | 4.45 | 0.05 | 0.02 | 0.02 | Bal |

Alloys 1 to 5 shown in Table 4 were melted and cast to ingots in a commonly practiced manner. Each ingot was heated at 500° C for 10 hours, and hot rolled at 440° C to provide a 4 mm thick sheet.

Subsequently, cold rolling was carried out to adjust the thickness of the sheet and intermediate annealing was carried out on the sheet by heating to a temperature of 450° C at a heating rate of 40° C./second, holding at that temperature for 20 seconds and cooling to room temperature at a cooling rate of 40° C./second. The sheet was then cold rolled to a 0.30 mm thick cold-rolled sheet with a final reduction in thickness of 60%.

Next, each cold rolled sheet was flattened using a roller leveller and heat treated at 270° C for 20 seconds under a tension of 1.7 kgf/mm². The heating rate and cooling rate in this heat treatment were about 40° C./second and about 60° C/second, respectively. For comparison, each cold-rolled sheet was heat treated at 170° C. for 2 hours in which the heating rate and the cooling rate were both 40° C./hour.

Table 5 shows the mechanical properties and pitting potentials measured for the sheets obtained as set forth above.

TABLE 5

Mechanical Properties and Pitting Potentials

| | Examples of the Present Invention | | | | |
|---|---|---|---|---|---|
| Alloy | 1 | 2 | 3 | 4 | 5 |
| Final heat treatment | 270° C. × 20 sec. | 270° C. × 20 sec. | 270° C. × 20 sec. | 270° C. × 20 sec. | 270° C. × 20 sec. |
| Yield strength (kgf/mm²) | 31.5 | 31.2 | 29.3 | 29.5 | 31.4 |
| Tensile strength (kgf/mm²) | 38.6 | 37.8 | 36.9 | 37.2 | 38.1 |
| Elongation (%) | 11 | 10 | 12 | 11 | 10 |
| Earing percentage 45°-four directions (%) | 3.4 | 3.5 | 3.2 | 3.0 | 3.3 |
| Erichsen value (mm) | 6.0 | 5.9 | 6.2 | 6.0 | 5.9 |
| Bend ductility | 17.1 | 16.6 | 16.9 | 16.8 | 16.7 |
| Pitting potential (mV vs SCE) | −697 | −688 | −680 | −684 | −698 |

| | Comparative Examples | | | | |
|---|---|---|---|---|---|
| Alloy | 1 | 2 | 3 | 4 | 5 |
| Final heat treatment | 170° C. × 2 Hr. | 170° C. × 2 Hr. | 170° C. × 2 Hr. | 170° C. × 2 Hr. | 170° C. × 2 Hr. |
| Yield strength (kgf/mm²) | 34.0 | 33.7 | 31.9 | 32.2 | 35.7 |
| Tensile strength (kgf/mm²) | 40.8 | 40.1 | 39.3 | 39.7 | 41.4 |
| Elongation (%) | 9 | 9 | 10 | 10 | 9 |
| Earing percentage 45°-four directions (%) | 3.4 | 3.4 | 3.2 | 3.1 | 3.4 |
| Erichsen value (mm) | 5.6 | 5.7 | 5.8 | 5.8 | 5.6 |
| Bend ductility | 15.2 | 15.4 | 15.4 | 15.6 | 15.3 |
| Pitting potential (mV vs SCE) | −730 | −718 | −707 | −709 | −743 |

*Average number of bending cycles for ten test specimens until rupture occurred.

As described above, the present invention can provide aluminum alloy hardened sheets which have sufficient mechanical properties as forming materials, especially as easy open can end stock and which are noble in pitting potential and insusceptible to corrosion. Further, since even if addition of Cu and Mg is increased, the aluminum alloy hardened sheets have a corrosion resistance well comparable with or superior to that of conventional aluminum alloy materials, they are expected to be improved in strength by increasing the amounts of the alloying elements. In applications where a strength level as high as that of prior art alloys is enough, the reduction of the final rolling step can be reduced and thereby the formability and anisotropy are further improved.

What is claimed is:

1. A method of producing a hardened aluminum alloy forming sheet having a high strength and a superior corrosion resistance, said method comprising the steps of;
   (1) providing a melt having a composition consisting of, in weight percentage,
       Mg: from 4.0 to 6.0%,
       Cu: from 0.05 to 0.50%,
       Mn: from 0.10 to 1.0%,
       Ti: from 0.01 to 0.05% and
       the balance being aluminum and impurities;
   (2) cooling to solidify said melt;
   (3) hot rolling and cold rolling to form a rolled sheet; and
   (4) heat treating said rolled sheet by heating to a temperature of 150 to 300 °C at a heating rate of at least 5 °C/ second, holding within five minutes at said temperature of 150 to 300 °C and cooling to a temperature of 70 °C or less at a cooling rate of at least 30° C./second.

2. A method as claimed in claim 1 in which said melt further contains 0.05 to 0.20% by weight Cr.

3. A method as claimed in claim 1 in which said heat treatment of said step (4) is carried out under tension after flattening said cold-rolled sheet by leveling at ordinary temperatures.

4. A method as claimed in claim 2 in which said heat treatment of said step (4) is carried out under tension after flattening said cold-rolled sheet by leveling at ordinary temperatures.

* * * * *